Figure 1:
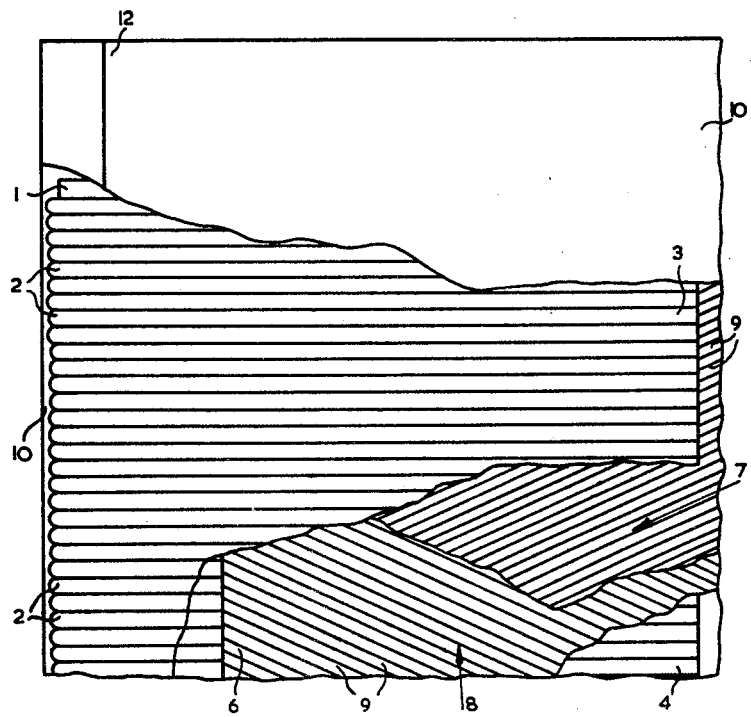

May 4, 1965  P. J. JENKINS  3,181,690
SEGMENTAL CONVEYOR BELT
Filed Dec. 2, 1963  4 Sheets-Sheet 1

Inventor
Peter John Jenkins
By Stevens, Davis, Miller + Mosher
Attorneys

May 4, 1965

P. J. JENKINS 3,181,690

SEGMENTAL CONVEYOR BELT

Filed Dec. 2, 1963

4 Sheets-Sheet 2

Inventor
Peter John Jenkins
By Stevens, Davis, Miller + Mosher
Attorneys

May 4, 1965 P. J. JENKINS 3,181,690
SEGMENTAL CONVEYOR BELT
Filed Dec. 2, 1963 4 Sheets-Sheet 4

Inventor
Peter John Jenkins
By Stevens, Davis, Miller & Mosher
Attorneys

United States Patent Office 3,181,690
Patented May 4, 1965

3,181,690
SEGMENTAL CONVEYOR BELT
Peter John Jenkins, Burscough, England, assignor to Dunlop Rubber Company Limited, London County, England, a British company
Filed Dec. 2, 1963, Ser. No. 327,190
Claims priority, application Great Britain, Dec. 2, 1962, 46,640/62
17 Claims. (Cl. 198—193)

This invention relates to a conveyor belt segment member and to a conveyor belt comprising said segment member.

According to the present invention, a belt segment member comprises a reinforcement embedded in a flexible material, and has at each end a transverse bead supported by a neck extending from the end of the segment member.

According to the present invention also, a segmental conveyor belt comprises a segment member or members according to the immediately-preceding paragraph, adjacent ends of the segment member or members being connected by a connecting member having two channels each extending transversely of the belt, the walls of each channel forming arms which engage around a bead and a neck to retain the bead within the channel.

The reinforcement which forms a part of the segment member usually consists of at least two longitudinally extending reinforcement plies of cords, an even number of such plies being preferred.

By longitudinally extending reinforcement plies as used throughout the specification there is meant reinforcement plies extending throughout substantially the whole of the segment member and comprising cords, which cords are disposed parallel to the longitudinal axis of the segment member or at a bias angle with respect to the longitudinal axis of the segment member of up to 40°, preferably from 15° to 30°.

In the case where the reinforcement comprises at least two reinforcement plies of cords in which the cords are disposed at a bias angle with respect to the longitudinal axis of the segment member, then the reinforcement plies are arranged so that the bias angle of the cords in one ply is in the opposite sense to that of the cords in an adjacent ply, i.e. the cords of one ply cross the cords of the other ply at an angle equal to the sum of the respective bias angles. Usually, the bias angle is the same in each ply.

The longitudinally-extending reinforcement plies may enclose the transverse bead at each end of the segment member, and in this manner two plies of reinforcement cords may be provided, the two plies being adhered together to form the neck at each end of the segment member. The bead can be made of cabled steel wires and the length of the bead is substantially equal to the width of a segment member.

Alternatively, and usually, the bead is enclosed by a ply of rubber-coated steel cords, the ends of the ply extending a short distance into the segment member and enclosing, or being enclosed by the ends of reinforcement plies extending longitudinally of the segment member. In such a case the steel cords enclosing the bead can be made stronger than the steel cords forming the reinforcement plies so that when adjacent segment ends are connected the joint produced will have a strength at least equal to the strength of the segment members.

The cords which form the reinforcement plies and the cords which enclose the bead, may be made of a textile material such as nylon, or the cords may be made of steel. Both textile cords and steel cords may be used.

The flexible material in which the reinforcement is embedded, and which forms the working surfaces of the segment member may be a natural or synthetic rubber composition, or a composition based on polyvinyl chloride.

The bead and neck extending outwardly from the end of the moulded assembly may be provided with a protective sheath of an abrasion resistant material. The sheath may engage directly around the bead and the neck and may be of substantial thickness, or a chafer strip may be interposed between the bead and the sheath. In the latter case the chafer strip is adhered to the steel cords enclosing the bead and the ends of the chafer strip are embedded in the rubber or like flexible plastic material. If the conveyor belt is required to trough during use, the sheath must be of a flexible material which will allow troughing and suitable materials for the sheath are thermoplastic materials such as polypropylene and nylon. If the conveyor belt is not required to trough in use, then the sheath can be of a rigid material such as steel.

The chafer strip, if present, should be of a material which can be readily bonded to the rubber or like flexible plastic material and can be cotton or nylon. The chafer strip should also be preferably easily penetrated by the rubber or like plastic material and suitable materials are open-woven nylon or cotton fabrics.

The connecting member can be rigid or can have rigid portions and flexible portions each of which extend transversely of the member and which are adhered together at their abutting surfaces, which allows transverse flexing of the conveyor belt if the belt is required to trough in use. The connecting member, or the rigid portion thereof may be formed from castings or pressings of a metal such as steel or spheroidal graphite cast iron or of a substantially rigid synthetic resin or the like substantially rigid organic polymer. The flexible portions may be of natural or synthetic rubber or the like flexible plastics material and may be bonded to the rigid portions, for example by an isocyanate composition. The connecting member may have a figure 8-shaped cross-section, the sides of the 8 being parallel and spaced apart at a distance substantially equal to the thickness of the belt, and the ends of the 8 being open so as to provide channels, each channel extending longitudinally of the connecting member, i.e. transversely of the segment member, to receive the bead of a segment end, and arms formed by the walls of each channel to engage round the bead and neck to retain the bead in the channel.

The arms of the connecting member may be shaped so that when the connecting member is assembled over the beads, a channel is formed between the outer surface of the arms and the end of the moulded rubber or like flexible material forming the segment member. The presence of this channel is advantageous in that trapped material is spilled out of the channel as the belt passes over the pulleys, and in this way grinding of trapped material is avoided.

Figure 2:
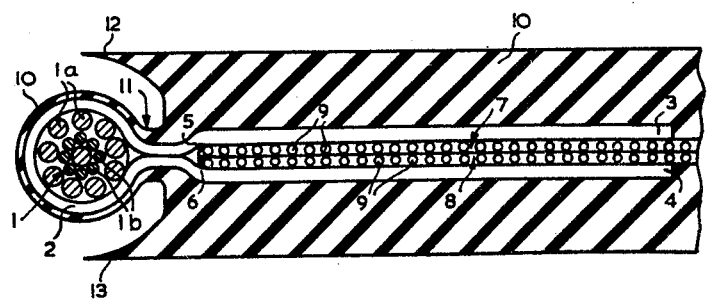
Figure 3:
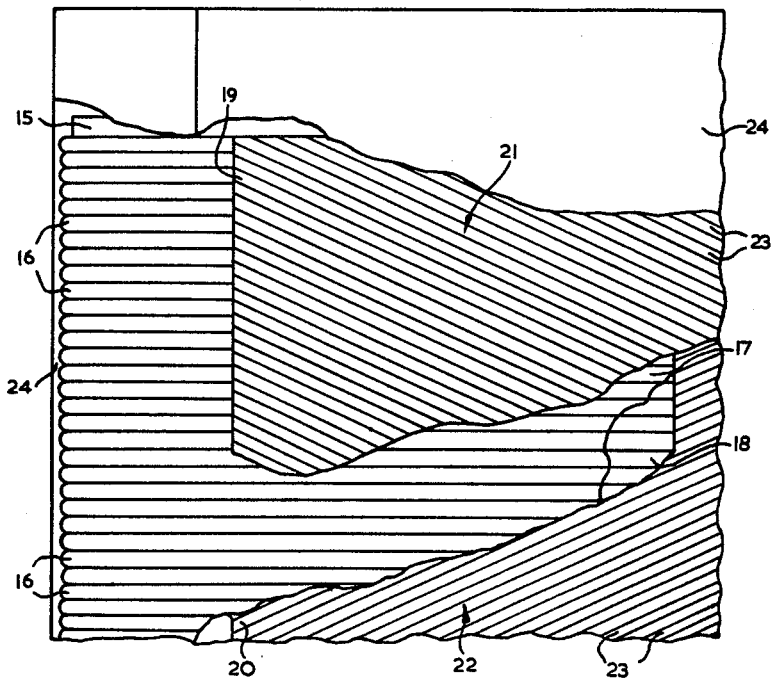
Figure 4:
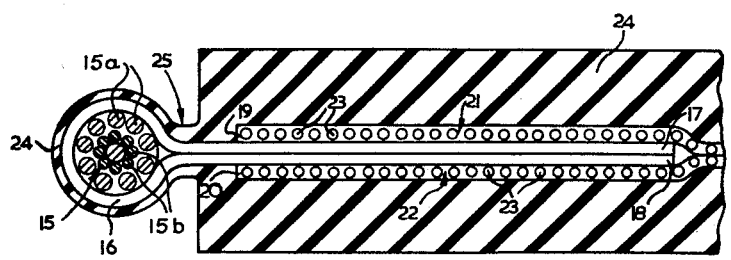
Figure 5:
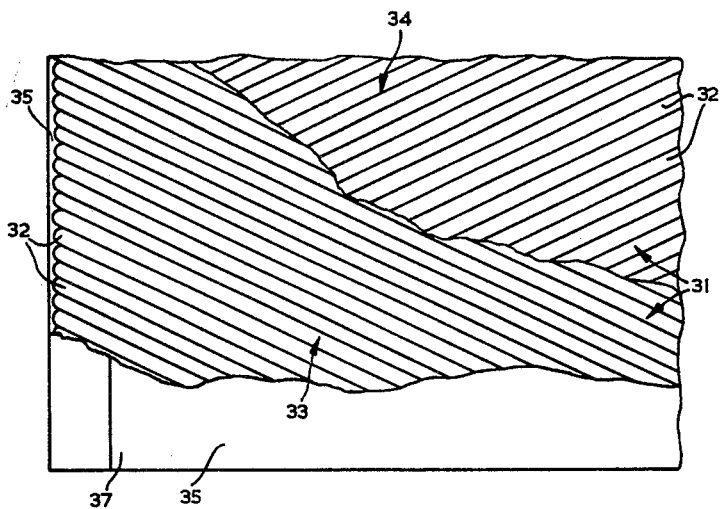
Figure 6:
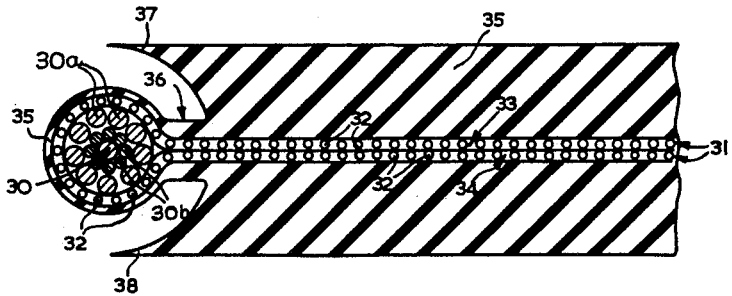
Figure 7:
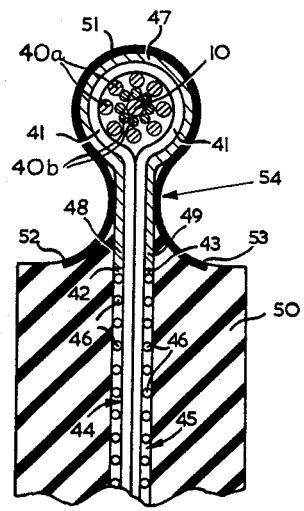
Figure 8:
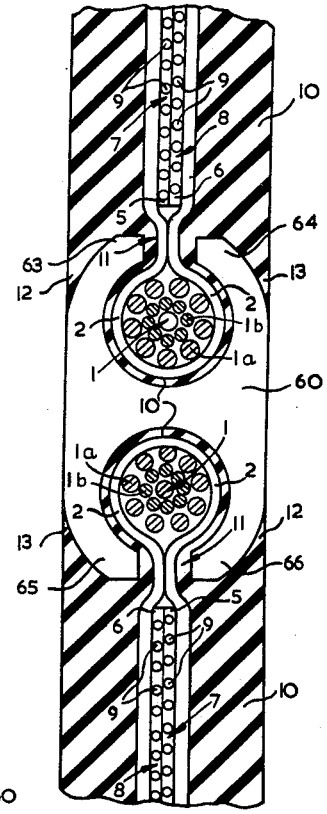
Figure 9:
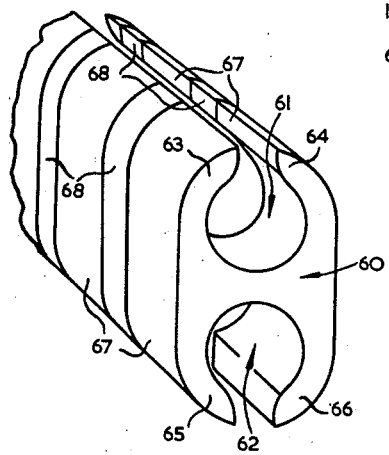

Several forms of belt segment members constructed in accordance with the present invention, and the method of connecting adjacent segment ends will now be described by way of example only with reference to the accompanying drawings in which:

FIGURE 1 shows the end of a segment member cut away in various places to show the construction in detail, FIGURE 2 shows a cross-section through the segment member shown in FIGURE 1, taken in a direction parallel to the longitudinal axis of the segment member, FIGURE 3 shows an alternative form of segment member cut away in various places to show the construction in detail, FIGURE 4 shows a cross-section through the segment member shown in FIGURE 3, taken in a direction parallel to the longitudinal axis of the segment member, FIGURE 5 shows a third form of segment member with various parts cut away to show the construction in detail, FIGURE 6 shows a cross-section through the segment member shown in FIGURE 5, taken in a direction parallel to the longitudinal axis of the segment member, FIGURE 7 shows a segment member having the bead thereof provided with a chafer strip and a protective sheath, FIGURE 8 shows two segment members connected by a connecting member, and FIGURE 9 shows a perspective view of a connecting member.

Referring to FIGURES 1 and 2 a belt segment member 1 has a transverse bead wire of cabled, die-formed steel wires 1a and 1b, enclosed by steel cords 2, which steel cords 2 are arranged in side by side relationship and disposed parallel to the longitudinal axis of the segment member. The ends 3 and 4 of the steel cords 2 extend a short distance into the segment member and enclose the ends 5 and 6 of two reinforcement plies 7 and 8 of steel cords 9. The steel cords 9 forming the reinforcement plies 7 and 8 are arranged in side by side relationship and disposed at an angle with respect to the longitudinal axis of the segment member of 15°, the angle of bias of the cords 9 of the ply 7 being in the opposite sense to the angle of bias of the cords 9 of the ply 8, i.e. the cords 9 of the ply 7 cross the cords 9 of the ply 8 at an angle of 30°. The assembly, including the bead has a covering of a vulcanized rubber composition 10. The end of the segment member is shaped to produce a short neck 11 and arms 12 and 13 shaped to engage the outer surfaces of the arms of a connecting member.

In the segment member shown in FIGURES 3 and 4 a bead wire 15 made of cabled steel wires 15a and 15b is enclosed by steel cords 16 which cords 16 are disposed parallel to the longitudinal axis of the segment member. The ends 17 and 18 of the steel cords 16 extend a short distance into the segment member and are enclosed by the ends 19 and 20 of two reinforcement layers 21 and 22 of steel cords 23. The cords 23 of the reinforcement plies 21 and 22 are biased with respect to the longitudinal axis of the segment member at an angle of 15°, the bias angle of the cords 23 of the ply 21 being in the opposite sense to the bias angle of the cords 23 of the ply 22. The assembly, including the bead has a covering of a vulcanized rubber composition 24, shaped to produce a neck 25.

In the segment member shown in FIGURES 5 and 6 a bead wire 30 of cabled steel wires 30a and 30b is enclosed by an endless band 31 of steel cords 32, which cords 32 are biased with respect to the longitudinal axis of the segment member at an angle of 15°. The endless band 31 of steel cords 32 forms two reinforcement layers 33 and 34 in which the cords 32 of the layers 33 are biased in the opposite sense to the cords 32 of the layer 34, i.e. the cords 32 of the layer 33 cross the cords 32 of the layer 34 at an angle of 30°. The assembly, including the bead has a covering of a vulcanized rubber composition 35 shaped to produce a short neck 36 and arms 37 and 38.

The segment member shown in FIGURE 7 has a bead wire 40 of cabled steel wires 40a and 40b enclosed by steel cords 41 which cords 41 are disposed parallel to the longitudinal axis of the segment member. The ends of the cords 41 extend a short distance into the segment member and are enclosed by the ends 42 and 43 of two reinforcement plies 44 and 45 of steel cords 46. The steel cords 46 of the plies 44 and 45 are biased with respect to the longitudinal axis of the segment member at an angle of 15°, the bias angle of the cords 46 of the ply 44 being in the opposite sense to the bias angle of the cords 46 of the ply 45. A strip 47 of an open-woven nylon fabric encloses the cords 41 at the end of the segment member to provide the cords 41 with a chafer strip, the ends 48 and 49 of the strip 47 extending a short distance into the segment member and being embedded in a vulcanized rubber composition 50 which provides the covering for the segment member. A protective sheath 51 of polypropylene encloses the strip 47, the ends 52 and 53 of the strip 51 being embedded in the vulcanized rubber composition 50 and the ends of the sheath 51 being shaped to produce a short neck 54.

The method of connecting adjacent segment ends is illustrated in FIGURE 8 which shows two segment members as shown in FIGURE 2 connected by means of a connecting member 60. The connecting member 60, shown also in FIGURE 9 has two channels 61 and 62, the walls of the channel 61 being shaped to form two arms 63 and 64 to engage around a bead and neck as shown in FIGURE 8. Similarly, the walls of the channel 62 are shaped to produce two arms 65 and 66 to locate around a bead and neck as shown in FIGURE 8. The connecting member 60 is formed of steel portions 67 and rubber portions 68 each of which extends transversely of the member 60, the steel portions 67 and the rubber portions 68 being bonded together at their abutting faces by an isocyanate composition.

The invention is advantageous in that it provides a belt segment member which can be easily and quickly connected to a similarly construction belt segment member, while the joint produced has a strength at least equal to the strength of the belt segment members. Further, a damaged segment member in a belt can be easily and quickly replaced by a new segment member.

Having now described my invention—what I claim is:

1. A belt segment member comprising a segment of flexible material, a reinforcement piece embedded within said flexible material and having at least two longitudinally extending plies of cords, a neck defined at each end of said segment of flexible material, a transverse bead disposed within and supported by said neck, a plurality of substantially inextensible cords enclosing said bead within said neck, arranged in a side-by-side relationship, and extending through a portion of length of said segment member.

2. A belt segment member according to claim 1 in which the transverse bead comprises cabled steel wires.

3. A belt segment member according to claim 1 in which the cords enclosing the transverse bead are disposed parallel to the longitudinal axis of the segment member.

4. A belt segment member according to claim 3 in which the ends of the cords enclosing the tranverse bead enclose the ends of the reinforcement plies.

5. A belt segment member according to claim 3 in which the ends of the cords enclosing the transverse bead are enclosed by the ends of the reinforcement plies.

6. A belt segment member according to claim 3 in which a chafer strip is provided over the cords enclosing the transverse bead, the ends of the chafer strip extending a short distance into the segment member.

7. A belt segment member according to claim 6 in which the chafer strip comprises an open-woven cotton fabric.

8. A belt segment member according to claim 6 in which the chafer strip comprises an open-woven nylon fabric.

9. A belt segment member according to claim 3 in which the transverse bead is provided with a protective sheath of an abrasion-resistant material, the ends of which sheath are embedded in the flexible material forming a part of the segment member.

10. A belt segment member according to claim 9 in which the protective sheath comprises polypropylene.

11. A belt segment member according to claim 3 in which the cords enclosing the tranverse bead are stronger than the cords forming the reinforcement plies.

12. A belt segment member according to claim 3 in which the cords are made of steel.

13. A belt segment member according to claim 3 in which the flexible material comprises a natural rubber composition.

14. A belt segment member according to claim 3 in which the flexible material comprises a synthetic rubber composition.

15. A belt segment member according to claim 3 in which the flexible material comprises a composition based on polyvinyl chloride.

16. A segmental conveyor belt comprising a plurality of segment members of flexible material, each of said members having a reinforcement piece embedded therein, a neck defined at each end thereof, a transverse bead disposed within said neck, a plurality of substantially inextensible cords enclosing said bead, a connecting member connecting adjacent necks of said segments and having two channels each extending transversely of the belt, the walls of each channel forming arms which engage around a transverse bead and neck to retain the bead within the channel, said connecting member comprising rigid portions and flexible portions each of which extends transversely of the member and which are adhered together at their abutting faces.

17. A connector for connecting the ends of adjacent segment members to form a conveyor belt, said connector comprising a body having two parallel sides defining transversely extending grooves on said opposite parallel sides, and being formed of a plurality of alternate rigid and flexible segments adhered together, said grooves each being enlarged toward the center of said body to form a channel, the walls of each chanel forming arms which engage the end of said segment members to retain said end within said channel.

References Cited by the Examiner
UNITED STATES PATENTS

| | | | |
|---|---|---|---|
| 1,612,024 | 12/26 | Jacobs | 198—193 |
| 2,449,950 | 9/48 | Nassimbene | 24—31 |
| 2,930,478 | 3/60 | Ruffino | 198—193 |

FOREIGN PATENTS 1,079,546   4/60   Germany.

SAMUEL F. COLEMAN, *Primary Examiner.*

EDWARD A. SROKA, *Examiner.*